US006439846B1

(12) United States Patent
Anderson et al.

(10) Patent No.: US 6,439,846 B1

(45) Date of Patent: Aug. 27, 2002

(54) TURBINE BLADE WALL SECTION COOLED BY AN IMPACT FLOW

(75) Inventors: Gordon Anderson, Baden (CH); Jorgen Ferber, Kussaberg; Rainer Hocker, Waldshut, both of (DE); Fathi Tarada, Kehrsatz (CH); Bernhard Weigand, Filderstadt-Sielmingen (DE)

(73) Assignee: Alstom, Paris (FR)

(*) Notice: Subject to any disclaimer, the term of this patent is extended or adjusted under 35 U.S.C. 154(b) by 0 days.

(21) Appl. No.: 09/446,949

(22) PCT Filed: Jun. 29, 1998

(86) PCT No.: PCT/CH98/00279

§ 371 (c)(1),
(2), (4) Date: Apr. 10, 2000

(87) PCT Pub. No.: WO99/01643

PCT Pub. Date: Jan. 14, 1999

(30) Foreign Application Priority Data

Jul. 3, 1997 (EP) ........................................... 97810441

(51) Int. Cl.[7] ............................................... F04D 29/58

(52) U.S. Cl. .................................. 416/96 R; 416/96 A

(58) Field of Search ............................. 416/96 R, 96 A

(56) References Cited

U.S. PATENT DOCUMENTS 5,321,951 A 6/1994 Falls et al.
5,352,091 A * 10/1994 Sylvestro .................. 416/96 A
5,533,864 A * 7/1996 Nomoto et al. ........... 416/96 A
5,586,866 A * 12/1996 Wettstein .................. 416/96 A
6,238,183 B1 * 5/2001 Williamson et al. ...... 416/96 A

FOREIGN PATENT DOCUMENTS

DE 4430302 A1 2/1996

OTHER PUBLICATIONS

"Vorarbeiten zur Berechnung und experimentellen Untersuchung von effusionsgekuhlten Gasturbinenschaufein", Schmidt, MTZ Motortechnische Zeitschrift 35 (1974), pp. 72–79.

* cited by examiner

*Primary Examiner*—John Kwon
(74) *Attorney, Agent, or Firm*—Burns, Doane, Swecker & Mathis, L.L.P.

(57) ABSTRACT

The invention relates to an impact flow for wall sections including a plurality of impact openings which are arranged on a plane in a flat or curved support. The support is fitted it a distance from the wall section, and the impact surface of the wall section that is to be cooled is configured as a bulged relief. The bulge elements are arranged around the impact surface of the impact beam. The surfaces of the bulge elements facing the impact beam include two curves which blend into one another.

7 Claims, 2 Drawing Sheets

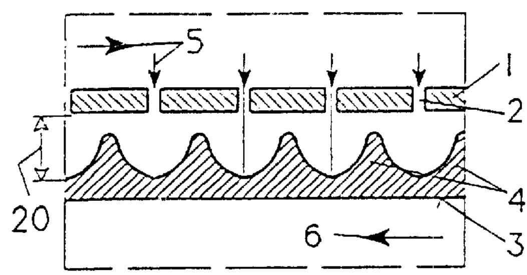
FIG.1
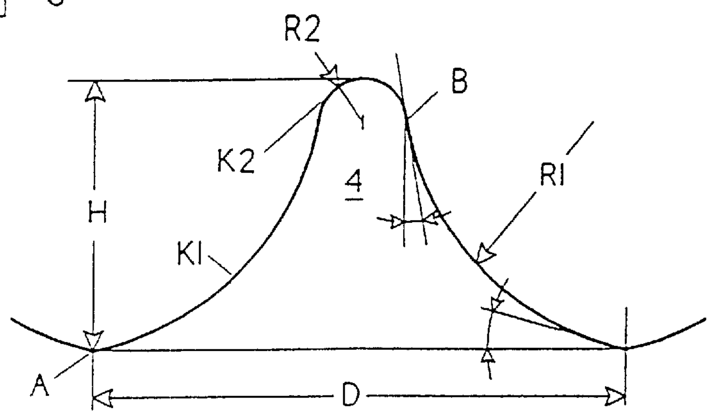
FIG.2
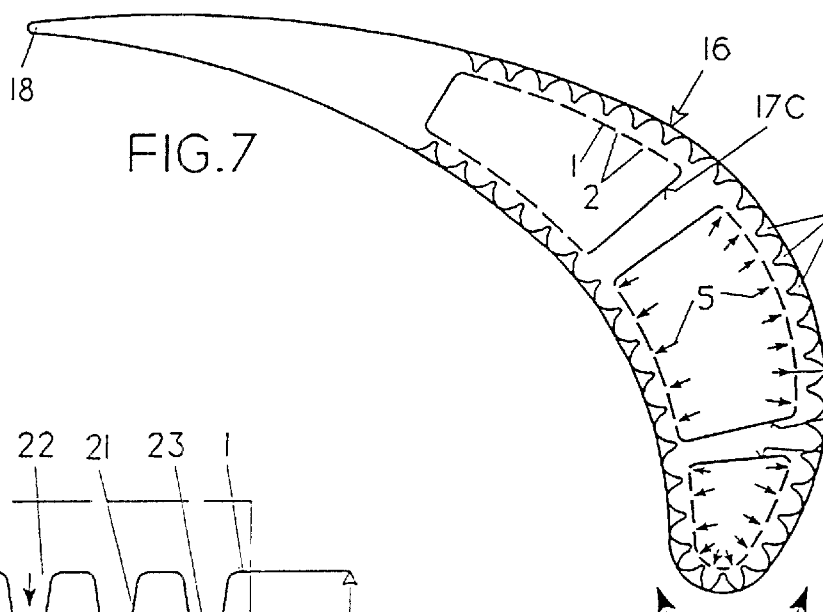
FIG.7
FIG.8
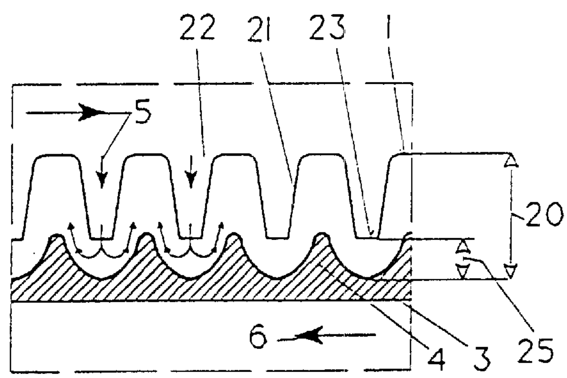

TURBINE BLADE WALL SECTION COOLED BY AN IMPACT FLOW

FIELD OF THE INVENTION

The invention relates to an arrangement for a wall section to be acted on by an impact flow.

Among convection cooling and heating processes, impact cooling or impact heating results in the highest heat transfer values. The impact flow is realized in that a cooling or heating fluid (e.g. air, water, water steam, hydrogen, liquid sodium, etc.) flows through one or more openings in a wall and impacts a facing surface more or less vertically. When impacting the impact surface, the free streams are deflected, and a flow forms parallel to the impact surface, resulting in a high heat transfer between the flow and the wall. To enlarge the heat transfer surface, known solutions provide it with roughness elements, usually in the form of ribs.

BACKGROUND OF THE INVENTION

An arrangement of the initially mentioned type is known from U.S. Pat. No. 5 321 951. The impacted surface of this document is provided with bulges arranged at regular intervals. The diameter of each bulge is at least as large as its height. The bulges are as a rule smaller than the known ribs or pins and, in addition to increasing the convection surface, are also supposed to create turbulence. The diameter of the bulge elements is small in relation to the diameter of the impact stream, so that an impact stream impacts several bulges at the same time. As a result of the irregular arrangement of the impact openings in the support, local differences in the impact on the impact surface with the bulges occur with a regular arrangement of the bulges.

Another type of impact cooling is known from DE-A-44 30 302. The method described there is characterized by a plurality of impact pipes that are arranged with their inlet in a plane on a flat or curved support and are oriented with their mouth against the wall section to be cooled, whereby the support is arranged at a distance from the wall section. In one exemplary embodiment (FIG. 3), the impact surface of the wall section to be cooled is constructed as a relief, whereby the streams directly impact the projecting bulges. This is supposed to even out the inhomogeneous heat transfer in the impact streams and achieve a homogeneous temperature distribution on the hot side of the wall section. In this arrangement, the bulges are constructed essentially as cylinders with rounded edges created during manufacturing. In another exemplary embodiment (FIG. 4), the relief has the form of ribs. In relation to the thermal transition, both geometries do not have any advantageous thermal boundary conditions. The heat, which can be transferred over the surface of an element projecting from the wall to be cooled, first must be passed through the element's base surface and the material to the surface. This creates a layering of temperatures in the material of the element. Depending on the material and geometry, this may have the result that at the points furthest away from the base of the element the temperature difference between fluid and element becomes so small that practically no heat transfer takes place any more.

SUMMARY OF THE INVENTION

The invention is based on the objective of creating an impact arrangement in which the bulging roughness elements are optimized in respect to the manufacturing process and thermal effectiveness. Based on the above mentioned known bulges, both geometry and their size and arrangement relative to the free streams must be considered for this.

In accordance with the present invention, an arrangement for a wall section to be impacted by an impact stream includes a plurality of impact openings arranged on a plane in a flat or curved support, with said support being arranged at a distance from the wall section. The wall section includes an impact surface to be cooled or heated and is constructed as a relief with bulge elements. The bulge elements are rotational bodies whose forming curve includes first and second curvature sections that merge with each other. And the bulge elements are arranged around the impact surface of the impact stream.

In accordance with another aspect of the invention, the first curvature section ends at the impact surface of the wall section. This curvature section has an angle which forms a circle segment having a radius, whereby the circle segment approaches at least approximately a curve of the form $x=\sqrt{y}$.

According to a further aspect of the present invention, the second curvature section has a radius which extends between two of the first curvature sections. At an intersecting point between the first and second curvature sections, the first and second curvature sections have a mutual tangent that forms an angle $\beta$ with respect to a direction normal to the plane of the wall section.

In accordance with an additional aspect of the present invention, each of the bulge elements includes a base, and the size of each base is such that the bases of adjoining bulge elements touch each other.

In accordance with a further aspect of the present invention, the uppermost points of the bulge elements are connected with the support.

According to a further aspect of the present invention, the wall section to be cooled or heated is constructed together with the bulge elements as a cast part.

In accordance with another aspect of the present invention, the impact openings form an inlet of impact pipes, the impact pipes have mouths which are oriented toward the wall section to be cooled or heated.

In accordance with an additional aspect of the present invention, the bulge elements are distributed symmetrically around the impact stream.

The advantages of the new measure are, among others, that as a result of the almost isothermal surface a high pin effectiveness is achieved, and that a high heat transfer is present also on the surfaces that are not oriented parallel to the wall that is supposed to be impacted with the impact streams. Because there are no sharp edges and small radii, a simple and cost-efficient manufacturing can be expected. The geometry can be easily molded and therefore cast; it is fault-tolerant and permits large dimensional tolerances. Because of the symmetry of the bulges, their arrangements does not depend on the incoming flow of the deflected impact agent. Finally, the new bulge elements also have low pressure losses.

The bulge elements also can be used as spacers for the stream-generating plate if this plate rests on the bulges. This measure is known per se, but the special configuration of the bulge elements results in hardly any losses in the heat transfer surface.

BRIEF DESCRIPTION OF THE DRAWINGS

The drawings show simplified views of several exemplary embodiments of the invention. In the drawings:

FIG. 1 shows a longitudinal section through an impact flow arrangement;

FIG. 2 shows the geometry of a bulge element;

FIG. 7 shows an impact-cooled gas turbine blade;

FIG. 8 shows an exemplary embodiment with impact pipes instead of impact openings.

Only those elements necessary for understanding the invention are shown. The various figures show elements with identical functions identified by the same reference numbers. The flow direction of the media is marked with arrows.

DETAILED DESCRIPTION OF THE PREFERRED EMBODIMENTS

Figure 3:
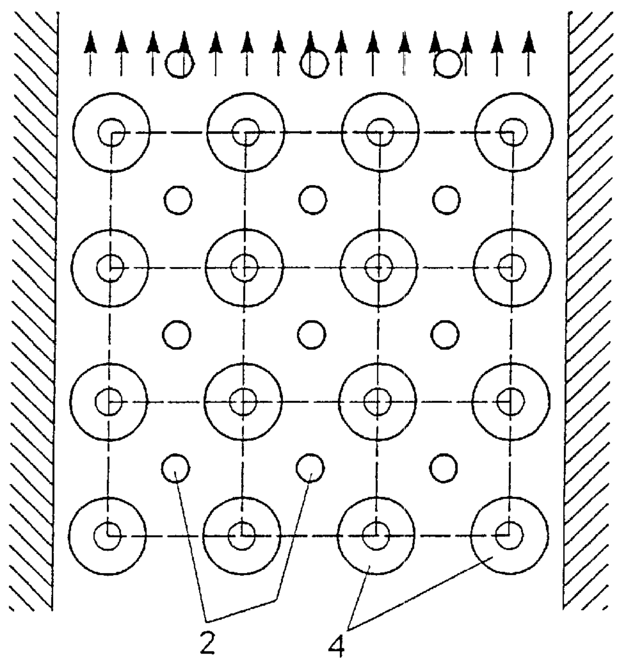
FIG. 3 shows a quad arrangement of bulge elements.

Below, the impact flow is called impact cooling, as it may be used, for example, to cool hot turbo machine components, such as gas turbine blades or combustor walls around which there is a flow.

In FIG. 1, the wall section to be cooled with cooling air 5 is designated, for example, with 3. This is a flat wall around which flows on the outside a hot medium designated by the arrows 6. The support I on the cooling air side has been constructed correspondingly. In the shown case, it is attached at a constant distance 20 with suitable means (not shown) to the wall. The support has a plurality of impact openings 2 and can be designed as a simple perforated metal sheet. A number of bulge elements 4 are arranged on the inside of the wall to be cooled, around the impact surface of the impact stream. These bulge elements are preferably cast along with the wall section. Naturally, these bulge elements 4 can also be used as spacers between the wall to be cooled and the support. In this case, the height (H in FIG. 2) of the elements corresponds to the distance 20, and it is useful that the bulge elements are connected at their uppermost point with the support 1.

The size of the base of the bulge elements is selected so that adjoining elements just touch each other. In this way the new bulge element differs decisively from the known roughness elements in which such an arrangement is not possible since otherwise the inevitable cross-currents would be adversely affected. It is nevertheless possible to increase the effective surface with the new geometry described below by about the same amount as in known elements while retaining the same unit height.

FIG. 2 explains the geometry of such a bulge element. If the element is built symmetrically, it does not only consist of two curvature K1, K2 that merge into each other at the surface facing the impact stream, but also at any desired longitudinal cross-section. The chosen geometry influences the thermal flux in such a way that the surface temperature only insignificantly decreases with an increasing distance from the base, and in this way an almost constant heat flux is able to flow through the entire surface.

The radius R2 of the curvature K2 of the bulge elevation should equal the minimum achievable radius, which in the end depends on what type of manufacturing has been chosen. In contrast, the radius of the curvature K1 that transitions into the impact surface to be cooled of wall section 3, should be selected as large as possible, i.e. in such a way that the circle segment approximates a curve of the form $x=\sqrt{y}$ as well as possible. The two curvatures have a common tangent in their intersection point B, which forms an angle $\beta$ with the vertical to the wall section 3. This value should be chosen as small as possible. The curvature ending at the base at point A forms the angle $\alpha$ with the base surface. This value is obtained from the construction with fulfillment of the above mentioned criteria if the height H of the bulge element is given, and the value for the base diameter D is selected as large as possible. This is the case if adjoining bulge elements 4 touch each other at the base at point A.

Since as a result of the geometry a sufficient temperature differential is ensured everywhere, the entire surface is able to transfer heat. In addition, the heat transfer coefficient is approximately the same at the surface as the one that would be present at the base surface without the bulge element. This is again in contrast to the known elements with surfaces extending vertical to the wall, in which a significantly reduced heat transfer coefficient should be expected.

Based on the new geometry of the bulge elements, several different possibilities of arranging them exist now and should be selected as a function of the desired heat transfer and/or tolerable pressure losses.

In relation to the cross-current in the area of the basis, principally two arrangements can be differentiated. This presupposes that in contrast to the initially mentioned known solution, the impact stream is not supposed to directly impact the bulge element.

Figure 4:
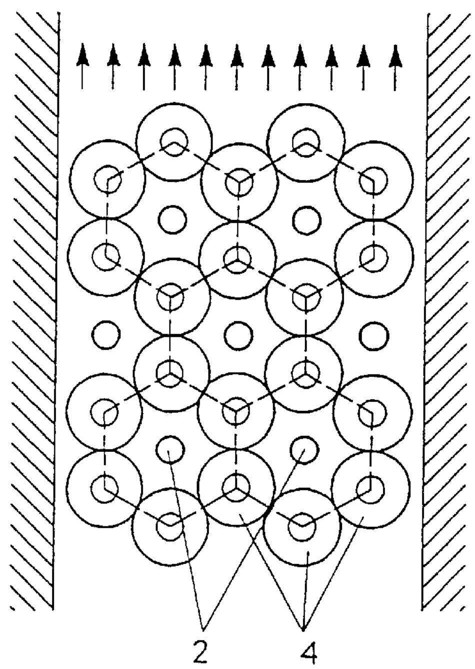
FIG. 4 shows a sextuplet arrangement bulge elements.

The impact openings 2 either can be all arranged in series, as in FIG. 3, or they can be off-set against each other, for example by half a pitch, as in FIG. 4. This results in a heat-transferring surface share per impact stream that is either square or hexagonal, as indicated by the broken lines in FIGS. 3 or 4 respectively.

It is preferred that the bulge elements 4 are located at the intersecting points of these broken lines. As shown in FIG. 3, each impact stream in the serial arrangement is surrounded by a maximum of four bulge elements that surround the free stream. If exactly the same size of bulge elements is assumed for both cases, then FIG. 4 shows that in the case of six elements these touch each other at the base.

Figure 5:
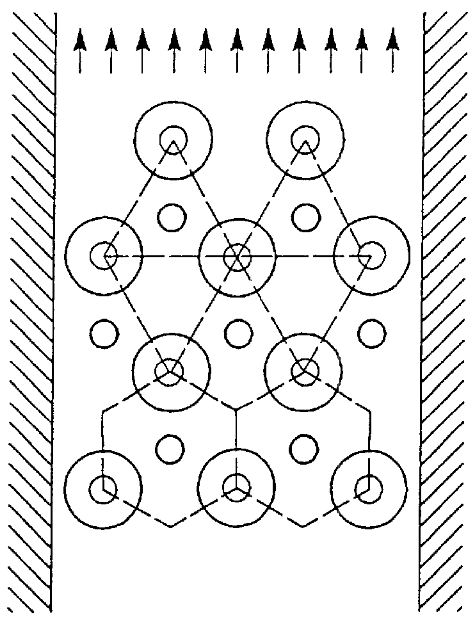
FIG. 5 shows a triplet arrangement of bulge elements.
Figure 6:
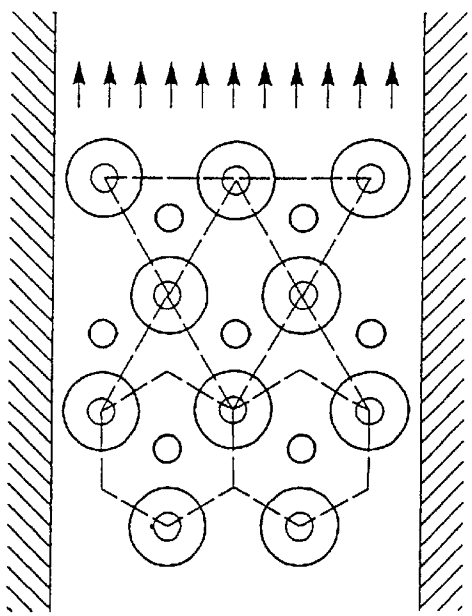
FIG. 6 shows a variation of the triplet arrangement according to FIG. 5.

It is recommended that in a serial arrangement all four intersecting points around a free stream are assigned. In an off-set arrangement with six intersecting points, however, two additional variations are reasonable. In these cases, only half of the intersecting points are assigned bulge elements in order to form a triangle in whose center the free stream impacts the wall. Depending on the requirements, the tip of the triangle hereby may be located in the direction of the cross-current, i.e. the outflowing current; the cross-current then directly impacts the downstream bulge element, as can be seen from FIG. 5. The tip of the triangle may however be oriented in opposite direction to the cross-current, i.e. the outflowing current, which means that the cross-current first flows through a gap between two bulge elements. This case is shown in FIG. 6.

FIG. 7 shows a gas turbine blade 16 as an example of a component that is being cooled. The supports with the impact openings 2 are designed as more or less tubular inserts 17A, 17B, and 17C and are arranged in the hollow inside of the blade. These inserts as well as the blade wall that is provided with bulge elements 4 can be constructed as a cast part. They can also be constructed as a pressure-bearing structure for internal pressures up to twice the pressure present in the actual impact zone.

In the case of a guide vane, the coolant usually flows into the inserts from the vane base towards the vane tip. The impact openings 2 and the bulge elements 4 are staggered over the blade height and the blade periphery at the required distance from each other. The coolant can flow through the inserts 17A–C either individually or in series.

The gas or steam coolant can be circulated in the plurality of inserts in a closed circuit, i.e. it is again withdrawn via the blade base after the cooling is complete. The coolant flowing off the cooled wall sections is however able to exit from the blade into the flow channel. This preferably takes place at that point in the blade that has the lowest external pressure. As a rule, this means that the coolant will be allowed to exit at the trailing edge 18 of the blade.

FIG. 8 shows an exemplary embodiment in which the support also has a flat shape and is provided with a plurality of impact pipes 21, which in this case are equidistant and arranged in rows. Their inlet 22 corresponds to an impact opening and is flush with the support surface. The impact pipes have a conical inside channel with constant narrowing in flow direction. The smallest cross-section of the impact pipes is therefore at the mouth 23. At their mouth 23, the impact pipes are oriented vertically against the wall section to be cooled. The mouth is located at an impact distance 25 from the wall. In the example, the ratio of this impact distance to the narrowest diameter of the impact pipes is approximately 1. It can be seen that the cooling air deflected after the impact is able to flow off into the free spaces 21 between the impact pipes without interfering with the adjoining impact streams. Given a vertical orientation of the impact pipes, the internal mass of this space is determined by the length of the impact pipes. In contrast to the cooling air streams that are created by a perforated metal sheet, this solution offers the advantage of a free design of the ratio of stream distance to stream diameter, which may range from 0.1 to 4.

The invention is naturally not limited to the shown and described examples. It is obvious that, depending on requirements, the number and pitch of the impact openings 2 or pipes 21 as well as length and form of the latter, can be optimized on a case by case basis. The invention is also not limited in respect to the selection of a coolant, its pressure, and further use after the cooling.

A person skilled in the matter also will recognize that the invention not only can be used for cooling wall sections of machines, apparatuses, or general installations, but also for their heating. Examples for such an application of superficial heating are, for example, the drying of paper, melting and fusing of plastics, de-icing of airplane wings, etc.

What is claimed is:

1. An arrangement for a wall section to be impacted by an impact stream, said arrangement comprising: a plurality of impact openings arranged on a plane in a flat or curved support, with said support being arranged at a distance from the wall section; wherein the wall section includes an impact surface to be cooled or heated and is constructed as a relief with bulge elements, wherein the bulge elements are rotationally symmetric bodies whose forming curve includes first and second curvature sections that merge with each other; and wherein the bulge elements are arranged around the impact surface of the impact stream.

2. The arrangement as claimed in claim 1, wherein said first curvature section ends at the impact surface of the wall section, said first curvature section having an angle which forms a circle segment having a radius, whereby the circle segment approaches at least approximately a curve of the form $x=\sqrt{y}$.

3. The arrangement as claimed in claim 1, wherein said second curvature section has a radius which extends between two of said first curvature sections and has at an intersecting point between the first and second curvature sections, a mutual tangent that forms an angle with respect to a direction normal to the plane of the wall section.

4. The arrangement as claimed in claim 1, wherein each of said bulge elements comprises a base, and wherein the size of each base is such that the bases of adjoining bulge elements touch each other.

5. The arrangement as claimed in claim 3, wherein the uppermost points of the bulge elements are connected with the support.

6. The arrangement as claimed in claim 1, wherein the wall section to be cooled or heated is constructed together with the bulge elements as a cast part.

7. The arrangement as claimed in claim 1, wherein the bulge elements are distributed symmetrically around the impact stream.

* * * * *